June 24, 1924.

E. N. ROTH

HOSE COUPLING

Original Filed Jan. 27, 1920   2 Sheets-Sheet 1

1,498,758

June 24, 1924.
E. N. ROTH
1,498,758
HOSE COUPLING
Original Filed Jan. 27, 1920   2 Sheets-Sheet 2
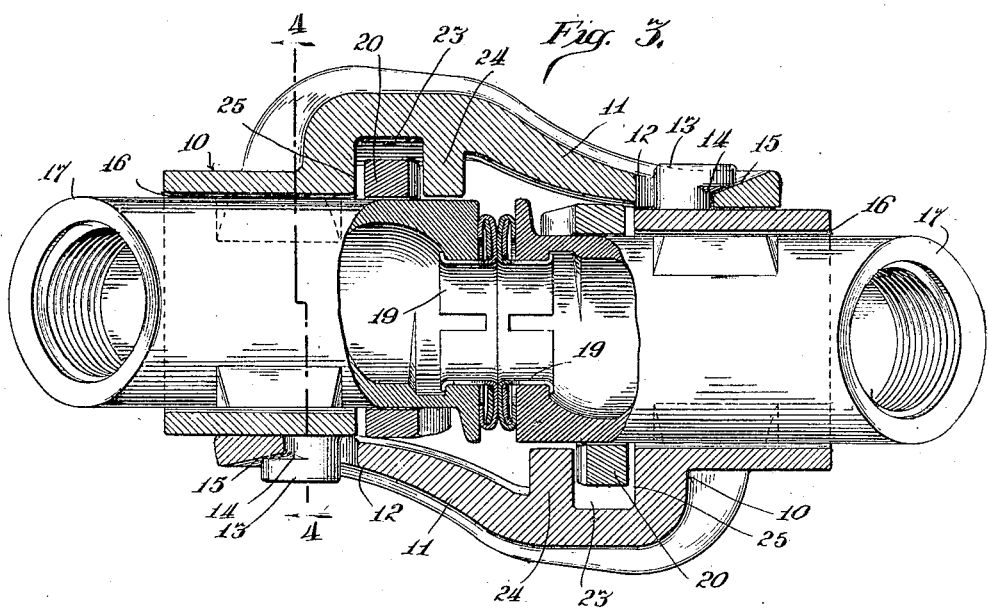
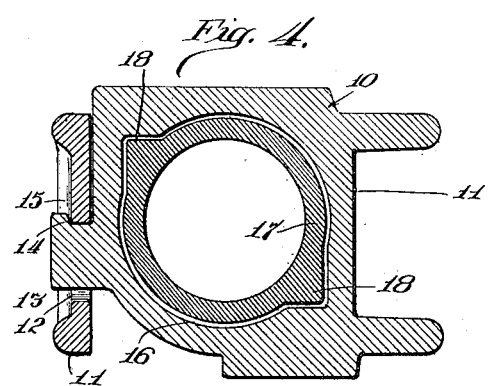
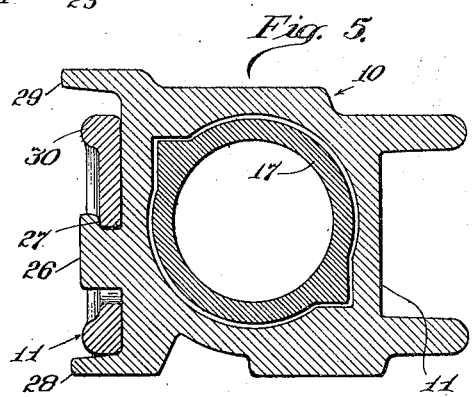
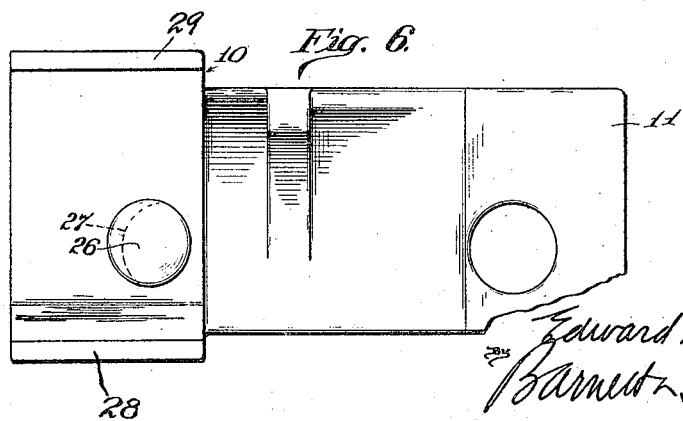
Inventor
Edward N. Roth
By Barnett Jinman
Attorneys.

Patented June 24, 1924.

1,498,758

UNITED STATES PATENT OFFICE.

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS.

HOSE COUPLING.

Application filed January 27, 1920, Serial No. 354,502. Renewed May 12, 1924.

*To all whom it may concern:*

Be it known that I, EDWARD N. ROTH, a citizen of the United States, residing at Chicago, in the county of Cook and State of Illinois, have invented certain new and useful Improvements in Hose Couplings, of which the following is a specification.

My invention relates to a hose coupling, and more particularly to a device for coupling together the hose or equivalent elements used for making the connection between the train pipes on the adjacent cars of a railway train, and the principal object of the invention is to provide a novel and improved hose coupling, particularly suitable for the steam train pipes of railway cars which instead of being constructed with the locking cams, so called, typical of hose couplings of the gravity type in which the coupling members are engaged and disengaged by rocking or rotary movements, are provided with engaging devices of a simplified character which make the manufacture of this coupling much cheaper, and the manipulation of the coupling members easier. The locking cams of the type of coupling referred to above require a relatively expensive machining operation to enable them to engage and properly lock the mating coupling members to form a tight joint in the train pipe line. The coupler heads or coupling members according to this invention are brought into engagement by sidewise movements of one toward the other, which has the advantage of not involving any destructive flexing of the hose or any rocking of one gasket on the other.

The invention consists in certain novel and improved constructions, arrangements and devices, to be hereinafter described and claimed, for carrying out the above stated objects, and such other objects as will appear from the following specification.

The invention is illustrated in the accompanying drawings, wherein:

Fig. 3 is a longitudinal horizontal section of the coupling shown in Fig. 1;

Fig. 4 is a transverse section along the line 4—4 of Fig. 3;

Fig. 5 is a corresponding cross section of a modified form of coupling; and

Fig. 6 is an elevation of this modification, showing one coupling member only.

Like characters of reference designate like parts in the several figures of the drawings.

Figure 1:
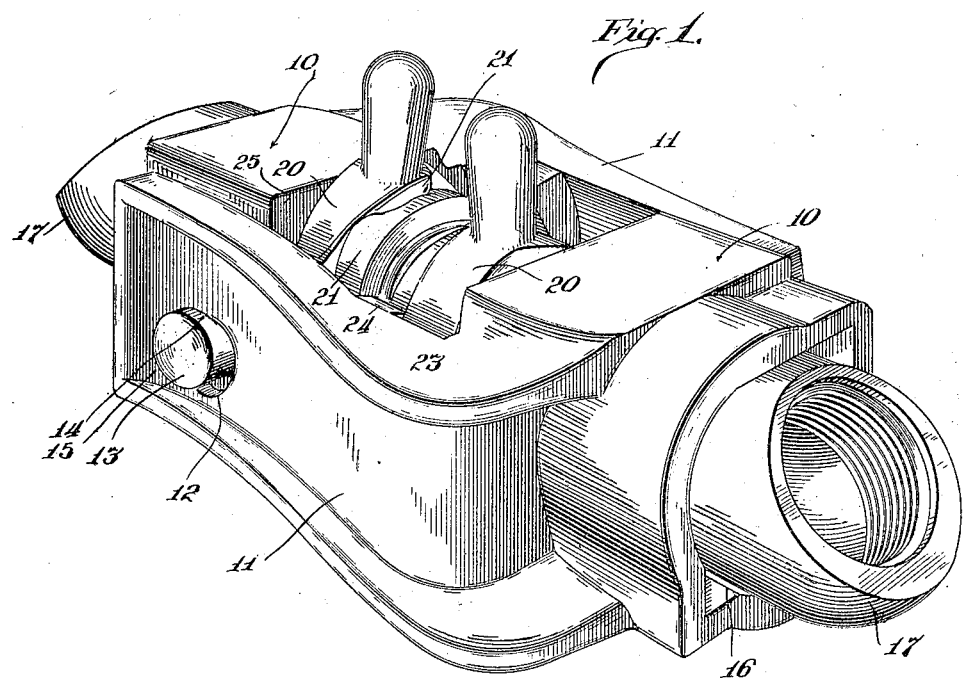
Fig. 1 is a perspective view showing the coupling members in coupled relation.
Figure 2:
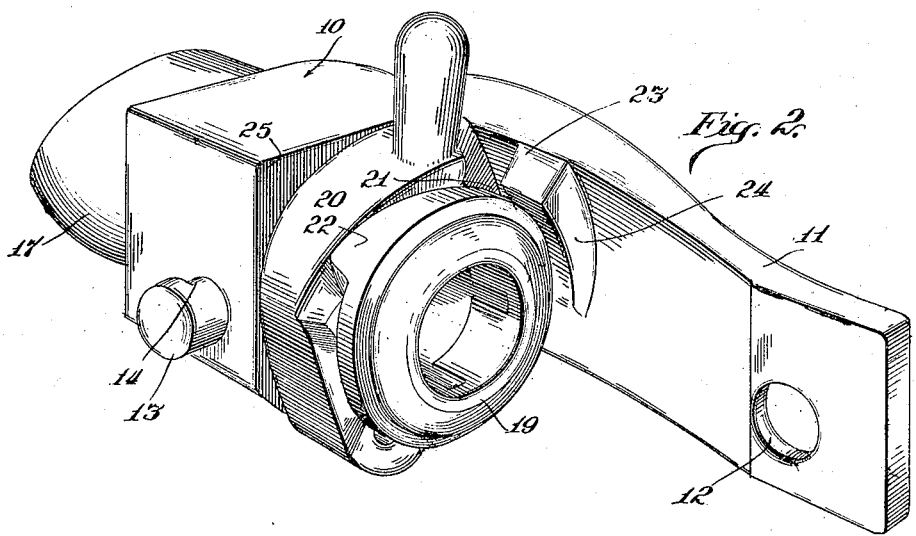
Fig. 2 is a perspective view of one coupling member.

Referring to the drawings, I have shown two coupling members or heads 10 of like construction, the description of one of which will be sufficient. The member 10 is provided with an arm 11 having an opening 12 therein to fit over a corresponding lug or stud 13 on the mating coupler member. The lug 13 is of a size to fit the opening 12 and is provided with an undercut recess 14 that is to say, on the face disposed away from the open end of the member 10 as hereinafter described. As will be best seen from Fig. 3, the edge of the opening 12 is preferably beveled as at 15 to fit into the undercut recess 14 of the lug 13.

The coupling member is hollow, being formed with a cylindrical bore 16. The conduit member or gasket holding member 17 is located therein and capable of longitudinal movement. In order to prevent the turning of the conduit member with respect to the coupling member I provide the member 17 with lugs or projections 18. Meeting faces of the members 17 are formed so as to make a tight joint. I have shown them provided with spring gaskets 19. Any suitable form of gasket may be used.

Longitudinal movement of the conduit member is produced by the cam ring 20 having cam surfaces 21 to correspond with the cam surfaces 22 on the conduit member. As many of such cam surfaces may be provided as may be necessary, preferably two however, the cam surfaces 22 being arranged diagonally; that is, not on a lateral or horizontal line, so that when the coupling is made the points of engagement of the cam rings with their respective gasket holding members will be on lines at an angle to each other (preferably at right angles), whereby perfect seating of the gaskets is assured. The cam ring is seated in a recess 23 of the coupling member and retained by a rib 24. The rear face of the cam ring 20, which is plane bears on the surface 25 of the coupling member.

The two members of the coupling are brought together as shown in Fig. 1 by moving them sidewise without any rocking movement. The conduit members being retracted there is sufficient play to permit the respective arms 11 to fit over the lugs 13. They will hang in this position until the train-man can manipulate the cam rings to lock them together, especially if, as is preferable, the lugs are undercut or notched, as shown. The coupling operation is completed by turning the cam rings in opposite directions, bringing the gaskets into contact and locking the coupling together by forcing the edge 15 of the opening 12 into the recess 14 of the lug 13. It will be noted that in the coupling operation it is not necessary to shift the hose or the coupler heads out of parallelism with each other. This permits the construction of a hose coupling in which there is little play between the members and in which the members when engaged and before being locked by manipulation of the conduit members will hang together in substantially correct alignment without appreciable sagging. This results from the fact that the vertical diameters of the studs 13 and the openings 12 are substantially the same at their engaging points. A slight relative movement longitudinally takes place in the engagement of the coupling members, but this does not permit an objectionable amount of rocking movement. The usual rubber composition, expansible gaskets, are not necessary. A metallic gasket may be used, or if the meeting faces of the conduit members are properly finished, no gaskets need be employed.

In Figs. 5 and 6 I have shown a modification of the means for holding the coupling members in coupled relation. In this modification the lug 26 is formed with a recess 27 on the upper side thereof. The body of the coupling member is formed with reinforcing ribs 28 and 29. In this modification, as in the one previously described, the coupling members will hang in proper position as soon as they are engaged. The trainman's hands are then free to manipulate the cams for completing the coupling and locking operation.

It will be obvious that various changes may be made in the means for attaching the arms of the coupling member to the mating coupling member and also in the means for clamping the gaskets together and locking the coupling member without departing from the spirit and scope of my invention.

I claim:

1. The combination of a hollow coupling member, a conduit movably supported in said member, means for moving said conduit longitudinally with respect to said member, and means on said member for effecting preliminary engagement with corresponding means on a mating coupler member by lateral movements, said preliminary engaging means consisting of an arm on one side of said member having an opening therein and a stud on the other side which coengage with like members on the mating coupler to hold said members in said alignment for further coupling and to prevent vertical relative movement of said members.

2. The combination of a hollow coupling member, a stud on one side of said member undercut at its rear face so as to provide a portion of reduced size longitudinally of the coupling member but of substantially the same size vertically, an arm on the other side of said coupling member provided with an opening, the arms and studs of two mating coupling members being adapted to move laterally into preliminary interengagement for holding the members by gravity in alignment, the vertical dimension of the engaging portion of the opening in the arm being substantially the same as the vertical dimension of the stud.

EDWARD N. ROTH.